UNITED STATES PATENT OFFICE.

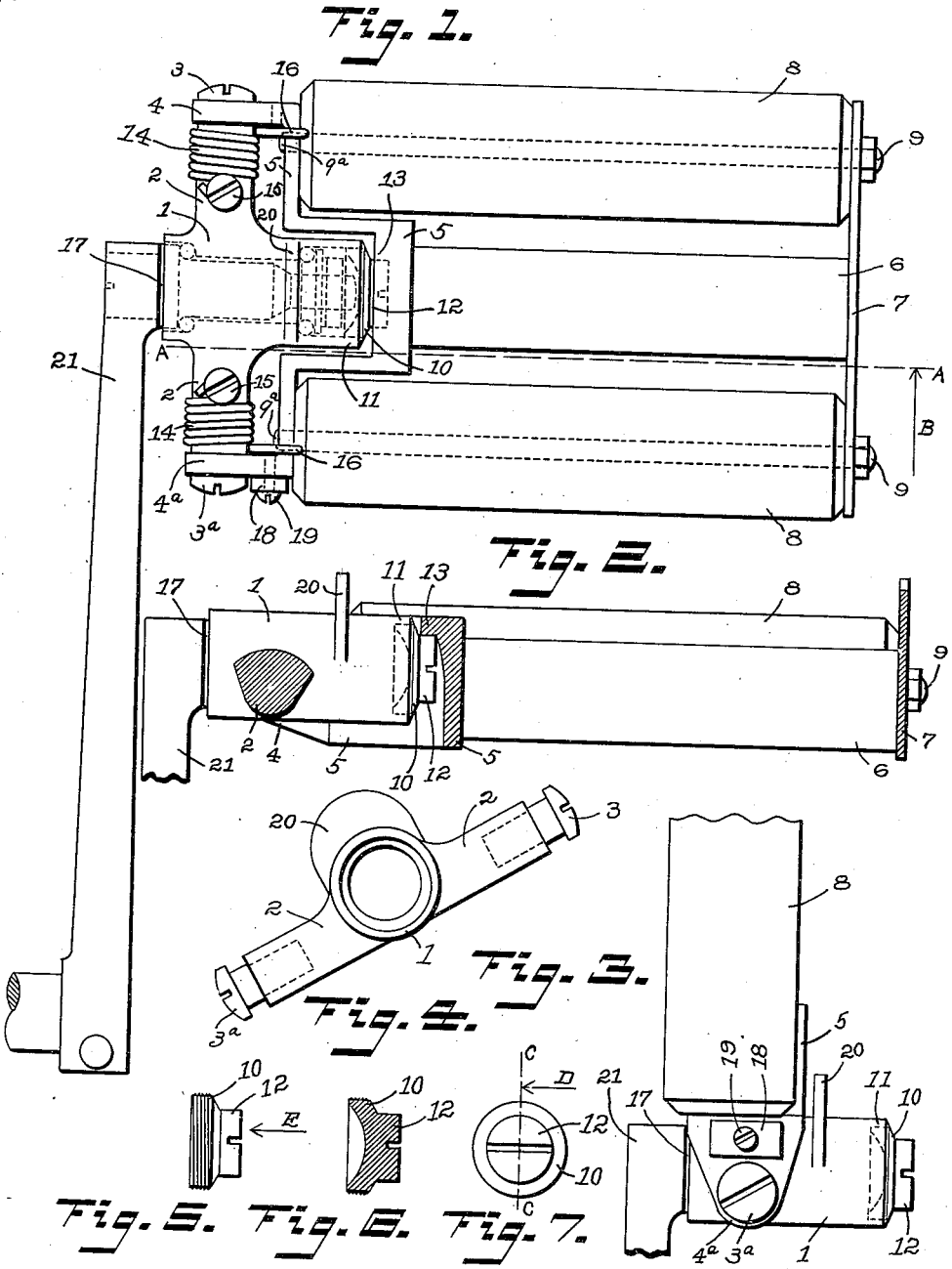

ELMER G. REYNOLDS, ELMER C. JOHNSON, AND FRANK D. WARREN, OF COLORADO SPRINGS, COLORADO.

PEDAL FOR MOTOR-CYCLES.

1,087,258.  Specification of Letters Patent.  Patented Feb. 17, 1914.

Application filed June 14, 1913. Serial No. 773,701.

*To all whom it may concern:*

Be it known that we, ELMER G. REYNOLDS, ELMER C. JOHNSON, and FRANK D. WARREN, citizens of the United States, residing at Colorado Springs, in the county of El Paso and State of Colorado, have invented a new and Improved Pedal for Motor-Cycles, of which the following is a full, clear, and exact description, reference being had to the accompanying drawings.

Since the ordinary pedal now in use on motor cycles is easily broken when the machine falls thereon the object of this invention is to provide a pedal that will fold up under the machine and thus prevent breakage.

Another object of the invention is to protect the pedal from damage when running into curbs, ruts or other obstructions.

Referring to the drawings, in all the figures of which like characters of reference designate like parts:—Figure 1 is an elevation view of the hinged pedal and crank. Fig. 2 is a sectional view of the pedal taken on the line A—A in Fig. 1, looking in the direction of arrow B, together with a fragmental portion of the crank. Fig. 3 shows a fragmental portion of the pedal turned upward, illustrating the hinged parts. A fragmental portion of the crank is also shown. Fig. 4 is an end view of the hub of the pedal, other parts being removed, and shows the arms which serve as pivots for the hinged portion of the pedal. Fig. 5 is a side elevation of the plug in the outer end of the hub. The outwardly projecting portion of this plug serves as a stop for the frame of the hinged portion of the pedal. Fig. 6 shows a sectional view of the plug taken on the line C—C in Fig. 7, looking in the direction of arrow D. Fig. 7 shows an end view of the plug looking in the direction of arrow E in Fig. 5.

The improved pedal comprises a hub 1 with two laterally extending arms 2 integral therewith, the outer ends of said arms being provided with screw pins 3, 3$^a$ upon which the ends 4, 4$^a$ of the yoke 5 are pivoted. A piece of tubing 6 connects the yoke 5 with the end plate 7, forming a rigid frame to support the rubber treads 8 which are mounted upon tread pins 9 in the usual way. The inner ends 9$^a$ of the said tread pins 9 are screw-threaded and are secured in holes tapped in the said yoke 5.

A screw plug 10 closes the outer end 11 of the hub 1, and the boss 12 of the plug 10 affords a support for the flange 13 of the yoke 5 of the hinged portion of the pedal.

Springs 14 are mounted upon the arms 2 and are secured thereto by means of screws 15 and the ends of the said springs engage the yoke 5 and are adapted to return the pedal to its normal position when it has, for any reason, been folded back or turned upward as illustrated in Fig. 3.

Since it is possible for the pedal to fold in one direction only it is desirable that the side on which the pedal folds should remain uppermost in order that the foot may not be placed upon the wrong side and fold the pedal backward, and to accomplish this certain parts of the pedal, namely, the arms 2, screw pins 3, 3$^a$, yoke 5, tubing 6, springs 14 and end plate 7 are placed with their centers of gravity below the axial plane of the spindle 17 upon which the hub 1 rotates, thus causing the pedal, upon being freed, to gravitate to the desired position.

The rear end 4$^a$ of the yoke 5 is weighted by means of a weight 18 secured by a screw 19, and has for its object the tilting of the pedal rearward at approximately the angle indicated in Fig. 4, in order that collision with any obstacle may throw the pedal rearward and upward and avoid breakage. The forward end 4 of the yoke 5 is also tapped to receive the screw 19 in order to secure the weight 18, making the pedals and parts interchangeable.

The inner foot guard 20 is saddled and brazed upon the hub 1. The spindle 17 is secured to the crank 21 in the usual manner.

The foregoing being a full, clear and exact description of the invention, what we claim and desire to secure by Letters Patent is:—

1. In a hinged pedal adapted to fold up when colliding with an obstruction, all available parts so disposed as to place a preponderance of weight on the lower side of said pedal and maintain a constant balance thereof, means for tilting said pedal, means for returning the hinged portion of the said pedal to normal position when deflected therefrom.

2. In a pedal of the class described, a hub, a spindle in said hub, arms extending laterally from said hub, pivots on said arms and a yoke adapted to swing on said pivots, said yoke adapted to form a part of the frame of the hinged portion of the pedal, a screw plug in the outer end of the said hub, a boss projecting outwardly on the said plug and adapted to form a support for the hinged portion of the pedal.

3. In a pedal of the class described, a hub and a spindle in said hub, arms extending laterally from said hub, a yoke adapted to be pivoted to said arms, a plug in the end of the said hub and a boss on the said plug, a flange on the said yoke adapted to engage the said boss and support the swinging portion of the pedal, springs mounted upon the said arms, said springs adapted to engage the said yoke and exert a downward pressure thereon.

4. In a hinged pedal adapted to fold up when colliding with an obstacle, a hub, arms on said hub, a yoke adapted to be pivoted upon said arms, a support on the outer end of said hub, a flange on said yoke engaging said support, a piece of tubing secured in a suitable manner to the said yoke and adapted to support the end plate.

5. In a hinged pedal adapted to fold up when colliding with an obstacle, a hub, arms on said hub, a yoke adapted to be pivoted upon said arms, means for supporting said yoke, a frame, tread pins mounted in said frame, the inner ends of said tread pins screw-threaded and adapted to be secured in holes in the said yoke, holes tapped in the said yoke and adapted to receive the inner ends of the said tread pins, the inner foot guard mounted upon the said hub and secured thereto.

6. In a motorcycle pedal, means adapting said pedal to fold up when the machine falls thereon and means for extending the folding portion of said pedal to normal position when released, means for balancing said pedal upon its spindle, and means for maintaining said pedal in an inclined position upon its axis.

Witness our hands this 10th day of June, 1913.

ELMER G. REYNOLDS.
   ELMER C. JOHNSON.
   FRANK D. WARREN.

Witnesses:
 Rose Reynolds,
 Margaret Boobyer.

---

Copies of this patent may be obtained for five cents each, by addressing the "Commissioner of Patents, Washington, D. C."